T857028

CROSS REFERENCE

BEST AVAILABLE COPY

DEC 17 1968

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 17, 1968

857 O.G. 695

636,584

HYDRAZONES OF PYRAZOLONE ALDEHYDES AND POLYMERIC MATERIALS STABILIZED THEREWITH

David J. Wallace and James M. Straley, both of P.O. Box 511, Kingsport, Tenn. 37662

Filed May 8, 1967. Published Dec. 17, 1968

Class 260—240

No Drawing. 17 Pages Specification

Novel hydrazones of pyrazolone carboxaldehydes, prepared by the reaction of a 5-pyrazolone-4-carboxaldehyde with an ortho hydroxy carbocyclic aromatic compound, are useful as copper deactivators for poly-α-olefins. These novel hydrazones have the general structure depicted below:

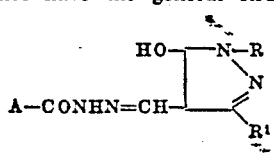

wherein A represents an ortho-hydroxyphenyl group or an ortho-hydroxynaphthyl group; R is H, alkyl or phenyl and $R^1$ is an alkyl, alkoxycarbonyl or phenyl group.